United States Patent
Lim et al.

(10) Patent No.: US 11,040,449 B2
(45) Date of Patent: Jun. 22, 2021

(54) ROBOT CONTROL SYSTEM AND METHOD OF CONTROLLING A ROBOT

(71) Applicant: HANWHA CO., LTD., Seoul (KR)

(72) Inventors: Chun Gyu Lim, Changwon-si (KR); Chang Woo Song, Changwon-si (KR)

(73) Assignee: Hanwha Co., Ltd., Seoul (KR)

( * ) Notice: Subject to any disclaimer, the term of this patent is extended or adjusted under 35 U.S.C. 154(b) by 303 days.

(21) Appl. No.: 16/220,105

(22) Filed: Dec. 14, 2018

(65) Prior Publication Data

US 2019/0193269 A1 Jun. 27, 2019

(30) Foreign Application Priority Data

Dec. 27, 2017 (KR) .................. 10-2017-0181433

(51) Int. Cl.
*B25J 9/16* (2006.01)
*G05D 1/02* (2020.01)

(52) U.S. Cl.
CPC ............. *B25J 9/1676* (2013.01); *B25J 9/162* (2013.01); *B25J 9/1607* (2013.01); *G05D 1/0214* (2013.01)

(58) Field of Classification Search
USPC .................................................. 700/245–264
See application file for complete search history.

(56) References Cited

U.S. PATENT DOCUMENTS

| | | | | |
|---|---|---|---|---|
| 6,526,373 | B1* | 2/2003 | Barral | B25J 9/1666 703/6 |
| 7,859,540 | B2* | 12/2010 | Dariush | B25J 9/1602 345/474 |
| 7,881,824 | B2* | 2/2011 | Nagasaka | B25J 13/085 700/260 |
| 8,423,189 | B2* | 4/2013 | Nakanishi | B25J 9/1676 700/255 |
| 8,634,955 | B2* | 1/2014 | Oaki | G05D 1/0227 700/245 |
| 8,824,776 | B2* | 9/2014 | Inazumi | B25J 9/1676 382/153 |
| 9,669,548 | B2* | 6/2017 | Tanabe | B25J 13/085 |
| 9,744,667 | B1* | 8/2017 | Ferguson | B25J 19/06 |

(Continued)

FOREIGN PATENT DOCUMENTS

| | | |
|---|---|---|
| JP | 5375062 B2 | 12/2013 |
| JP | 5593968 B2 | 9/2014 |
| WO | 2016103308 A1 | 6/2016 |

*Primary Examiner* — Jonathan L Sample
(74) *Attorney, Agent, or Firm* — Sughrue Mion, PLLC (57) ABSTRACT

A robot control system for controlling a robot including an actuator is provided. The robot control system includes: a collision detector configured to detect a collision occurring between the robot and an external object during movement of the robot, a driving controller configured to control the actuator, a position calculator configured to calculate at least one of collision position coordinate information indicating a collision position where the collision occurs and pushed position coordinate information indicating a pushed position to which the robot is pushed by a collision force generated from the collision, and a restart coordinate setter configured to set the collision position or a position included in a preset moving path of the robot and spaced apart from the collision position as a restart position for restarting a moving operation of the robot, based on a result of the calculation by the position calculator.

19 Claims, 7 Drawing Sheets

(56) References Cited

U.S. PATENT DOCUMENTS

| | | | |
|---|---|---|---|
| 9,764,472 B1* | 9/2017 | Ebrahimi Afrouzi | ........................ B25J 9/1666 |
| 10,618,176 B2* | 4/2020 | Takahashi | ............... B25J 9/1694 |
| 2007/0042716 A1* | 2/2007 | Goodall | ................ H04W 16/18 455/67.11 |
| 2008/0231221 A1* | 9/2008 | Ogawa | .................... B25J 13/085 318/568.12 |
| 2010/0235033 A1* | 9/2010 | Yamamoto | ............. G05D 1/024 701/26 |
| 2014/0025203 A1* | 1/2014 | Inazumi | ................. B25J 9/1666 700/255 |
| 2016/0031082 A1* | 2/2016 | Hazan | .................... B25J 9/1664 700/250 |
| 2016/0279797 A1* | 9/2016 | Zunke | .................... B25J 9/1692 |
| 2017/0357270 A1* | 12/2017 | Russell | ................ G05D 1/0242 |
| 2018/0143634 A1* | 5/2018 | Ott | ........................ G05D 1/0214 |
| 2019/0193269 A1* | 6/2019 | Lim | ........................ B25J 9/1676 |

* cited by examiner

ROBOT CONTROL SYSTEM AND METHOD OF CONTROLLING A ROBOT

CROSS-REFERENCE TO THE RELATED APPLICATION

This application claims priority from Korean Patent Application No. 10-2017-0181433, filed on Dec. 27, 2017, in the Korean Intellectual Property Office, the disclosure of which is incorporated herein in its entirety by reference.

BACKGROUND

1. Field

Apparatuses and methods consistent with exemplary embodiments of the inventive concept relate to a robot control system which may effectively respond to an accidental collision, thereby having improved stability.

2. Description of the Related Art

Cooperative robots are designed to work together with human beings in the same work space. In the control technology for cooperative robots, human safety should be considered a top priority.

Research to respond to an accidental collision that occurs between a robot and an external object while the robot is moving has been carried out on robots in various fields. In consideration of a situation in which a cooperative robot collides with a human being, safety measures against collision accidents involving cooperative robots should be provided.

In order to secure safety, the speed of movement of a robot is limited to a relatively slow speed range. However, a cooperative robot moving at a slow speed may also collide with an external object. When a robot has an accidental collision, technology that allows the robot to autonomously, safely, and rapidly respond to the accidental collision is needed.

For example, assuming that a cooperative robot collides with a human being or an object, if the robot continues to move after the accidental collision, without stopping, the robot may keep pushing the human being or object until it contacts a wall or another obstacle, causing a serious accident.

Although a method of simply stopping the movement of a robot when a collision occurs has been considered, such a method of simply stopping the movement of a robot is not sufficient to avoid damage of the robot due to an accidental collision.

Furthermore, when an accidental collision occurs, in order to re-operate the robot after stopping the movement of the robot, much time may be needed or an operator needs to be involved, which is inconvenient.

SUMMARY

One or more exemplary embodiments provide a robot control system which may effectively respond to an accidental collision that may occur during movement of a robot. Also, one or more exemplary embodiments include a robot control system which may autonomously, safely, and rapidly restart a robot movement after the accidental collision.

Various aspects will be set forth in part in the description which follows and, in part, will be apparent from the description, or may be learned by practice of the presented exemplary embodiments.

According to one or more exemplary embodiments, there is provided a robot control system for controlling a robot including an actuator. The robot control system may include: a collision detector configured to detect a collision occurring between the robot and an external object during movement of the robot, a driving controller configured to control the actuator, a position calculator configured to calculate at least one of collision position coordinate information indicating a collision position where the collision occurs and pushed position coordinate information indicating a pushed position to which the robot is pushed by a collision force generated from the collision, and a restart coordinate setter configured to set the collision position or a position included in a preset moving path of the robot and spaced apart from the collision position as a restart position for restarting a moving operation of the robot, based on a result of the calculation by the position calculator.

The robot further may include an end effecter, and the restart coordinate setter may be further configured to: calculate, from the collision position coordinate information and the pushed position coordinate information, a moving distance of the robot after the collision occurs; calculate, based on a dimension of the end effecter and the moving distance, an adjustment position for avoiding interference between the end effecter and the external object, the adjustment position being included in the preset moving path of the robot; and select one of the collision position and the adjustment position as the restart position for restarting the moving operation of a robot.

The driving controller may control the actuator by selecting one of a plurality of driving modes, and the driving controller is further configured to, in response to detecting the collision by the collision detector, control the actuator by selecting a force retaining mode among the plurality of driving modes, in which a force generated by the actuator is maintained to be within a predetermined range.

The robot control system may further include a force calculator configured to calculate a collision force applied to the robot, wherein the pushed position coordinate information calculated by the position calculator indicates a position to which the robot is pushed by the collision force in response to the driving controller controlling the actuator by selecting the force retaining mode, and the restart coordinate setter is configured to set the restart position for restarting the moving operation of the robot based on the result of the calculation by the position calculator and a result of the calculation by the force calculator.

The actuator may include a motor that is operated by an electrical signal, and the collision detector may detect the collision by sensing a change of a current of the motor.

The collision detector may detect the collision by comparing a command value transmitted to the actuator with an operation result value of the actuator operated by the command value.

The actuator may include a rotating shaft, an encoder configured to detect a change in a position of the rotating shaft, and a motor operated by an electrical signal, wherein the collision detector may detect the collision from a detection signal of the encoder.

The plurality of driving modes used by the driving controller may include at least two modes selected from a speed control mode for controlling driving speed of the robot, a position control mode for controlling a position of the robot, a force control mode for controlling a force generated by the robot, and the force retaining mode.

The robot may include a plurality of joints and a driving body, and the actuator may include a joint actuator for driving the plurality of joints and a driving actuator for driving the driving body, and, in the force retaining mode executed in response to detecting the collision, the actuator is configured to generate a retaining force to maintain the plurality of joints and the driving body at current positions, and be operated such that, in the force retaining mode, in response to determining that an external force applied to the robot from outside is greater than the retaining force, at least one of the positions of the plurality of joints and the driving body is changed by the external force.

In the force retaining mode, a size of the retaining force may be set such that the robot is pushed to change at least one of the current positions by a reaction force acting on the robot in response to detecting the collision.

The robot may further include an end effecter provided at a final end portion of the plurality of joints, and the force calculator may be further configured to calculate a size and direction of the collision force applied to the robot by using, as inputs, an angle value of the joints and an external torque value applied to the plurality of joints, and using a Jacobian matrix.

The robot control system may further include a storage storing current position information of the joint actuator and the driving actuator, wherein the position calculator calculates the collision position coordinate information and the pushed position coordinate information using the current position information.

The robot may further include an end effecter provided at a final end portion of the plurality of joints, wherein the restart coordinate setter is further configured to calculate a moving distance of the robot as a result of the collision, based on the collision position coordinate information and the pushed position coordinate information, and set the restart position of the robot based on a dimension of the end effecter and the moving distance.

When there is a position that is closer to the pushed position of the robot than the restart position on the preset moving path of the robot, the restart coordinate setter may reset the closer position as the restart position.

According to one or more exemplary embodiments, there is provided a method of controlling a robot. The method may include: setting a moving path of the robot; controlling the robot to move along the moving path; in response to detecting a collision of the robot in the moving path, controlling the robot to change its current position according to an external force applied to the robot in view of a reference force; calculating coordinates of the current position and the changed position; and determining a restart position at which an operation of the robot is restarted, based on a result of the calculating.

The restart position may be determined by: calculating an adjustment position which is spaced apart by a predetermined distance from the current position where the collision occurs; determining a proximity position, which is the closest to the changed position, among a plurality of preset positions in the moving path; and selecting one of the proximity position and the adjustment position as the restart position considering distances from the changed position to the proximity position and the adjustment position.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments which are illustrated in the accompanying drawings, wherein like reference numerals refer to like elements throughout. In this regard, the presented embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

The configuration and operation of a robot control system according to an exemplary embodiment is described below in detail with reference to the accompanying drawings.

Figure 1:
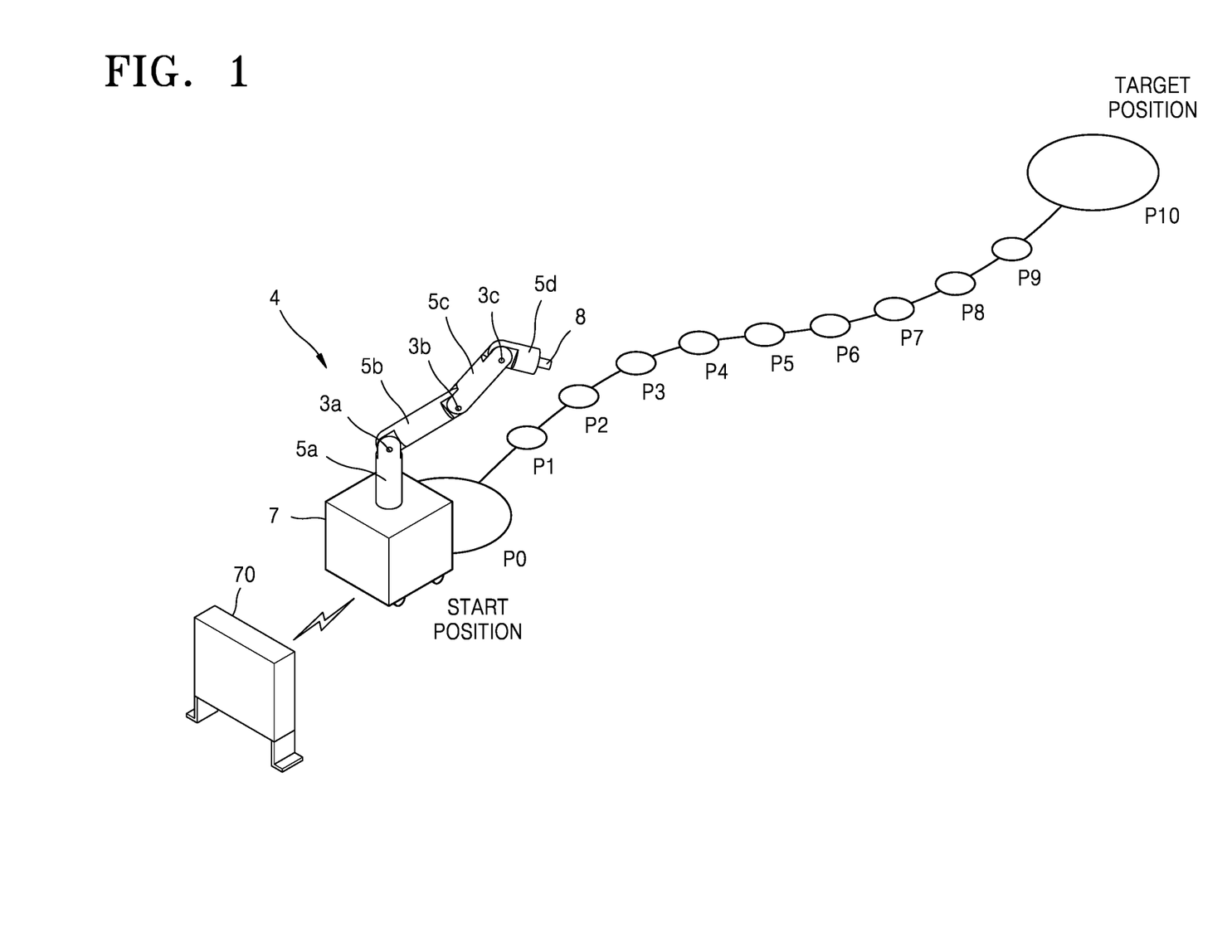
FIG. 1 exemplarily illustrates an operational state of a robot control system according to an embodiment.

FIG. 1 exemplarily illustrates an operational state of a robot control system according to an embodiment.

Referring to FIG. 1, the robot control system may include a robot 4 and a controller 70 for controlling the robot 4. The robot 4 may include a plurality of arms 5a, 5b, 5c, and 5d rotatably connected to one another through a plurality of joints 3a, 3b, and 3c, and an end effecter 8 mounted on the arm 5d at a final end portion of the joints 3a, 3b, and 3c.

The robot 4 may include a driving body 7 for performing a driving function. The robot 4 and the controller 70 are connected to each other wiredly or wirelessly. The robot 4 performs a driving operation by sequentially passing positions P1 to P9 on a moving path set from a start position P0 to a target position P10 according to a signal transmitted from the controller 70. The positions P0 to P10 may be preset and stored in a memory or storage of the robot 4.

Figure 2:
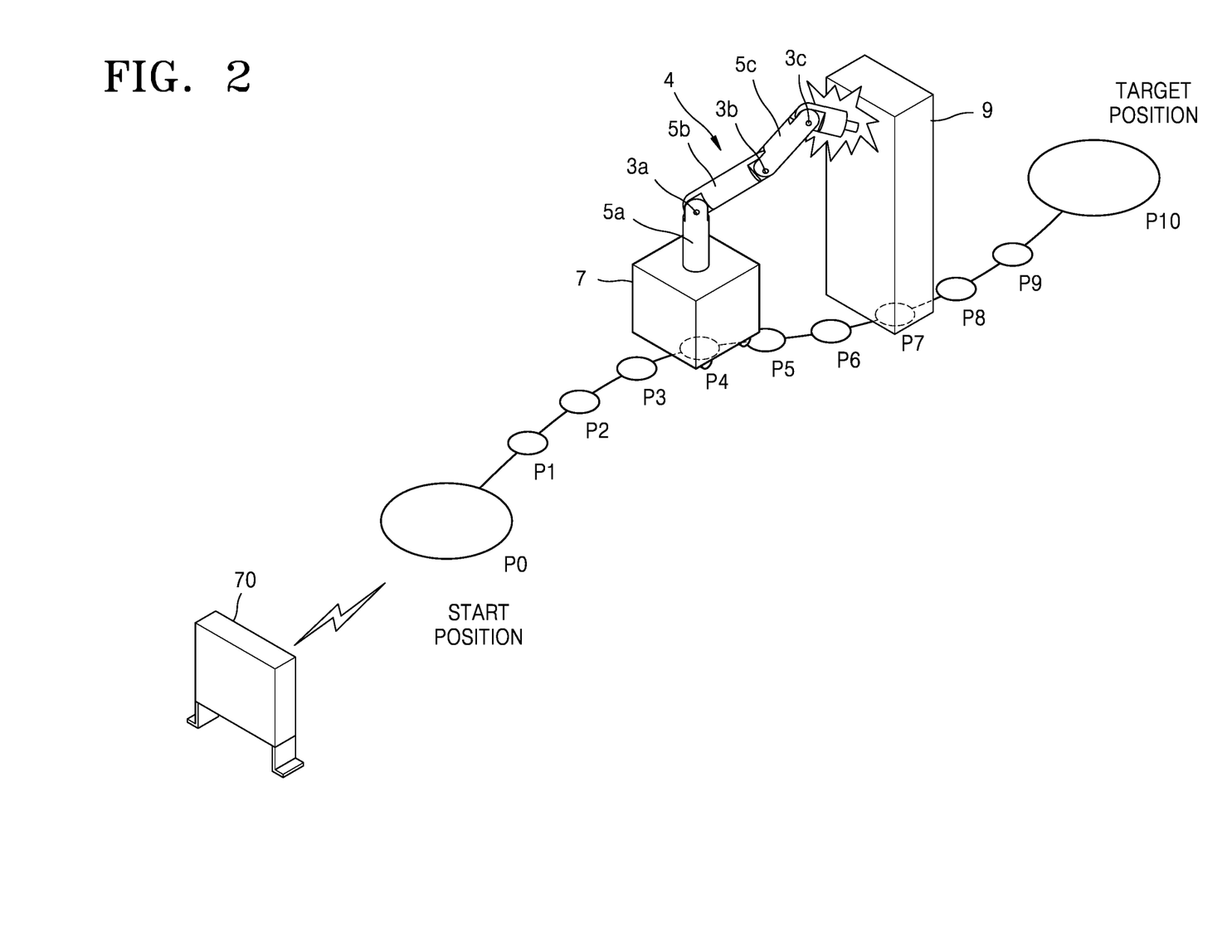
FIG. 2 exemplarily illustrates an accidental collision of a robot occurring during an operation of the robot control system of FIG. 1.
Figure 3:
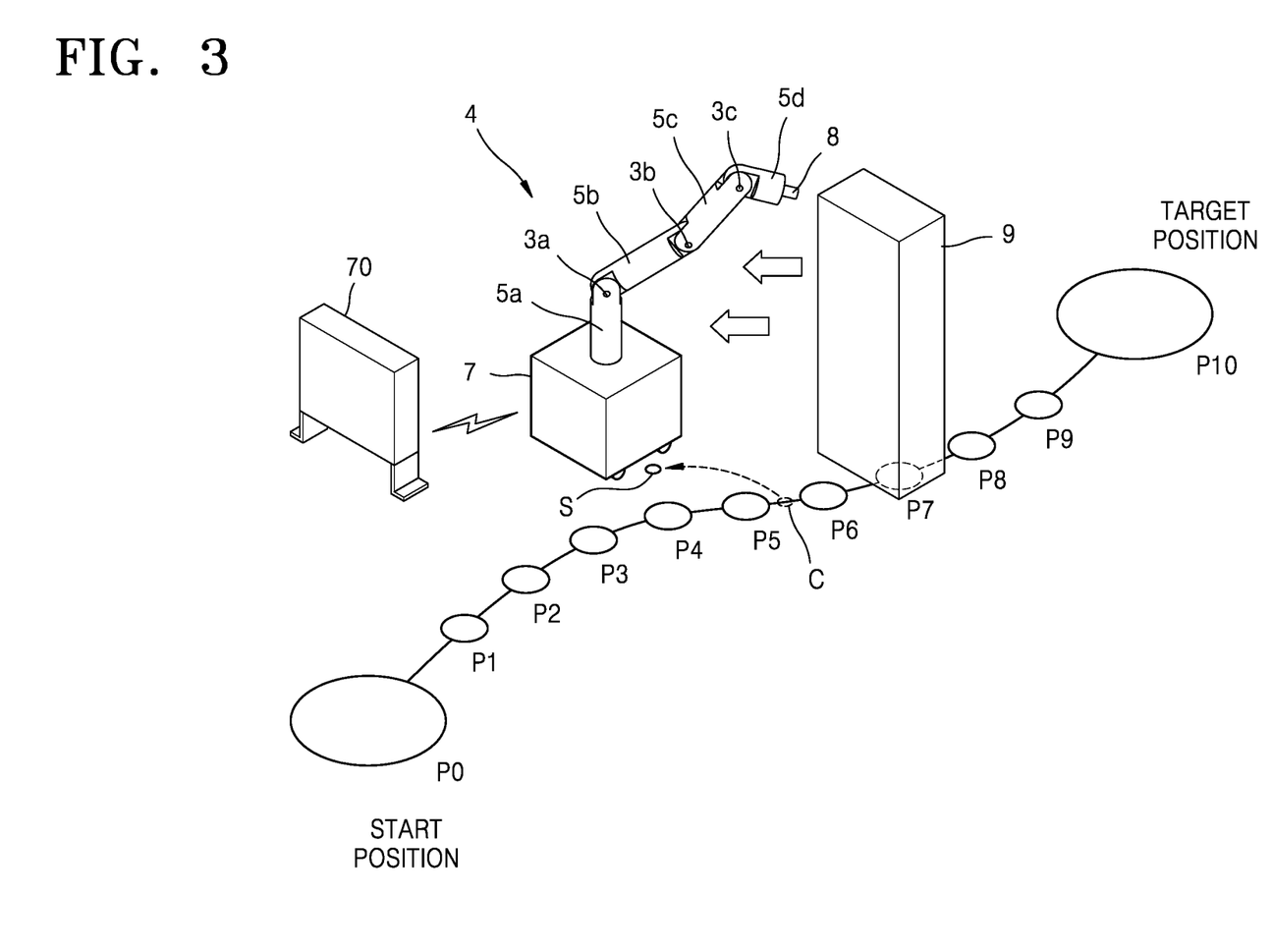
FIG. 3 exemplarily illustrates a change in the position of the robot of FIG. 2 according to the accidental collision.

FIG. 2 exemplarily illustrates an accidental collision of the robot 4 during an operation of the robot control system of FIG. 1. FIG. 3 exemplarily illustrates a change in the position of the robot 4 according to the accidental collision of the robot 4 of FIG. 2.

FIG. 2 exemplarily illustrates an accidental collision in which, while moving along the positions P1 to P9 of a previously set moving path, the robot 4 collides with an external object 9.

The controller 70 may control the robot 4 by selecting one of a plurality of driving modes. The driving modes operated by the controller 70 may include at least two of a speed control mode, a position control mode, a force control mode, and a force retaining mode.

In a position control mode, the position of the robot 4 is accurately controlled by setting the positions of the joints 3a, 3b, and 3c, the end effecter 8, and the driving body 7 to be target values to be controlled.

In a speed control mode, moving speed and operation speed of the robot 4 are stably controlled by setting moving speed and/or accelerations of the joints 3a, 3b, and 3c, the end effecter 8, and the driving body 7 to be target values to be controlled.

In a force control mode, a size of a force exerted by the robot 4 during moving or operation of the robot 4 is accurately controlled by setting the sizes of forces generated by the joints 3a, 3b, and 3c, the end effecter 8, and the driving body 7 to be target values to be controlled. The force control mode may be a torque control mode for controlling a size of torque generated by, for example, a motor.

In a force retaining mode, to maintain the positions of the joints 3a, 3b, and 3c, the end effecter 8, and the driving body 7 at current positions, the sizes of forces generated by the joints 3a, 3b, and 3c, the end effecter 8, and the driving body 7 are controlled to be constant within respective ranges of a preset size of a force or less. The force retaining mode may be a torque retaining mode for controlling the size of torque generated by, for example, a motor, to be constant at a preset retaining torque or less.

The force retaining mode is executed when the robot 4, while moving, collides with the external object 9, as illustrated in FIG. 2. Since the controller 70 and the robot 4 are provided with a function of detecting an accidental collision, as soon as the accidental collision occurs between the robot 4 and the external object 9, the controller 70 controls a driving mode for driving the robot 4 to be in the force retaining mode.

In the force retaining mode, that is, in the torque retaining mode, the robot 4 is controlled to generate a minimum amount of torque to maintain the current posture and position. In the torque retaining mode, when an external torque applied to the robot 4 by an external force from the outside is greater than a reference torque, which may be equal to a preset retaining torque, the position of the robot 4 is changed as at least one of the joints 3a, 3b, and 3c and the driving body 7 is pushed by the external torque.

In the torque retaining mode, the reference torque is set such that the position of the robot 4 is pushed by a reaction force acting on the robot 4 by the accidental collision as illustrated in FIG. 3.

Figure 4:
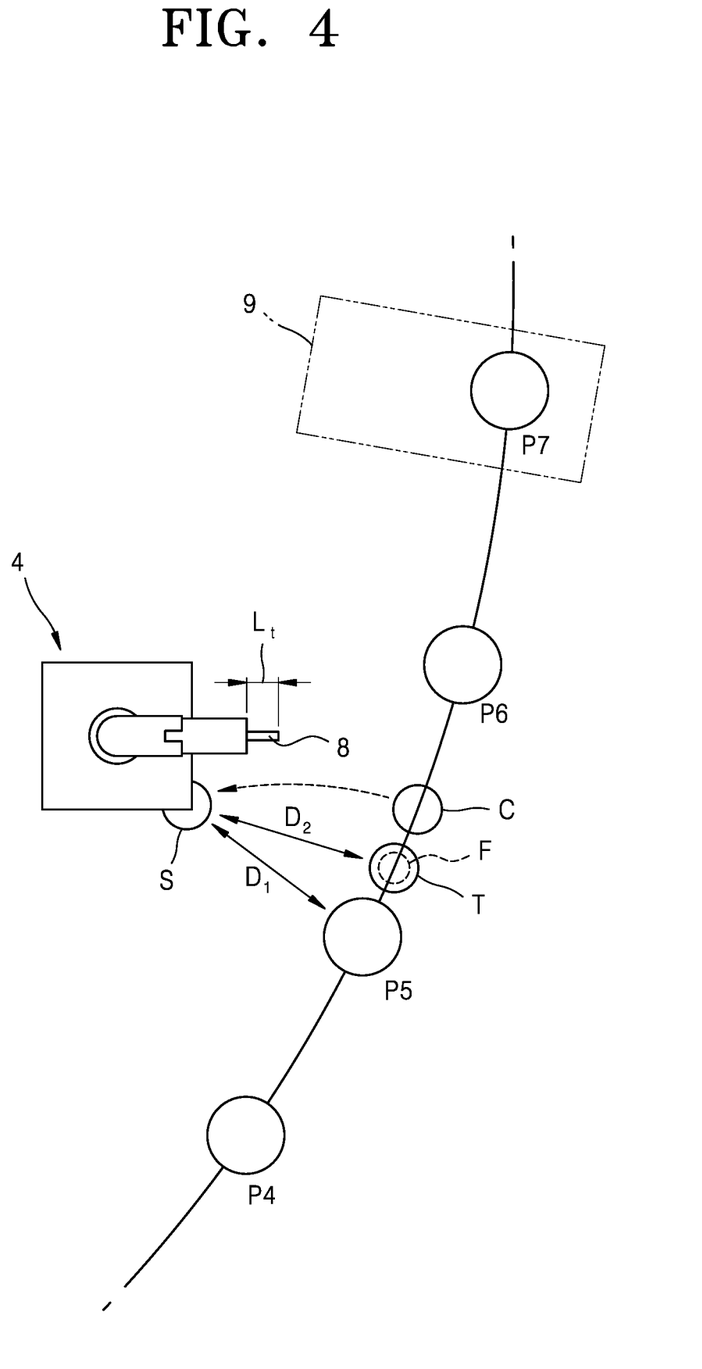
FIG. 4 exemplarily illustrates an operational state of a robot control system for responding to the accidental collision of the robot of FIG. 2.

FIG. 4 exemplarily illustrates an operational state of a robot control system to respond to the accidental collision of the robot 4 of FIG. 2.

In a control system for controlling a robot according to the related art, since only information about a start position, a target position, and preset positions related to a moving path are provided, the control system is difficult to identify a collision position C where an accidental collision occurs. Accordingly, an operator is involved to re-operate a robot after an accidental collision by manually reassigning a restart position to restart a moving operation of the robot or by forcibly moving the robot to the restart position to restart the moving operation from the beginning. Thus, the restart of a robot is difficult and it takes much time.

According to the robot control system according to an exemplary embodiment, when the robot 4 collides with the external object 9 at the collision position C while moving, for example, from the position P5 to the position P6, the robot 4 is pushed by a reaction force due to the collision and moved to a pushed position S.

The robot control system may calculate at least one of collision position coordinate information indicating the collision position C, pushed position coordinate information indicating the pushed position S, and a collision force applied to the robot 4 when the collision occurs, and set a restart position T to restart the moving operation of the robot 4 based on a result of the calculation.

Basically, the robot control system may set the collision position C to be the restart position T to restart the moving operation of the robot 4. When the robot 4 and the external object 9 are removed from the collision position C, the robot 4 may be moved to the collision position C that is set to be the restart position T.

In a process of setting the restart position T, an adjustment position F for reducing interference between the robot 4 and the external object 9 may be calculated considering that the external object 9 may still exist on the moving path of the robot 4. The adjustment position F is spaced apart from the collision position C and included in the moving path of the robot 4.

After the robot control system calculates the adjustment position F, any one of the collision position C and the adjustment position F of the robot 4 is set to be the restart position T. In other words, a position to avoid the interference between the robot 4 and the external object 9 is set to be the restart position T by using at least some pieces of information such as the collision position C and the pushed position S of the robot 4, a size of the robot 4, and a dimension, such as a length Lt, of the end effecter 8.

Furthermore, after determining the restart position T, a proximity position P5 that is one of the positions P1 to P9 on the moving path of the robot 4, which is closest to the pushed position S, is determined. Then, by comparing a distance D1 between the pushed position S and the proximity position P5 and a distance D2 between the pushed position S and the restart position T, the closest position may be determined to be a final restart position to restart the moving operation of the robot 4.

Figure 5:
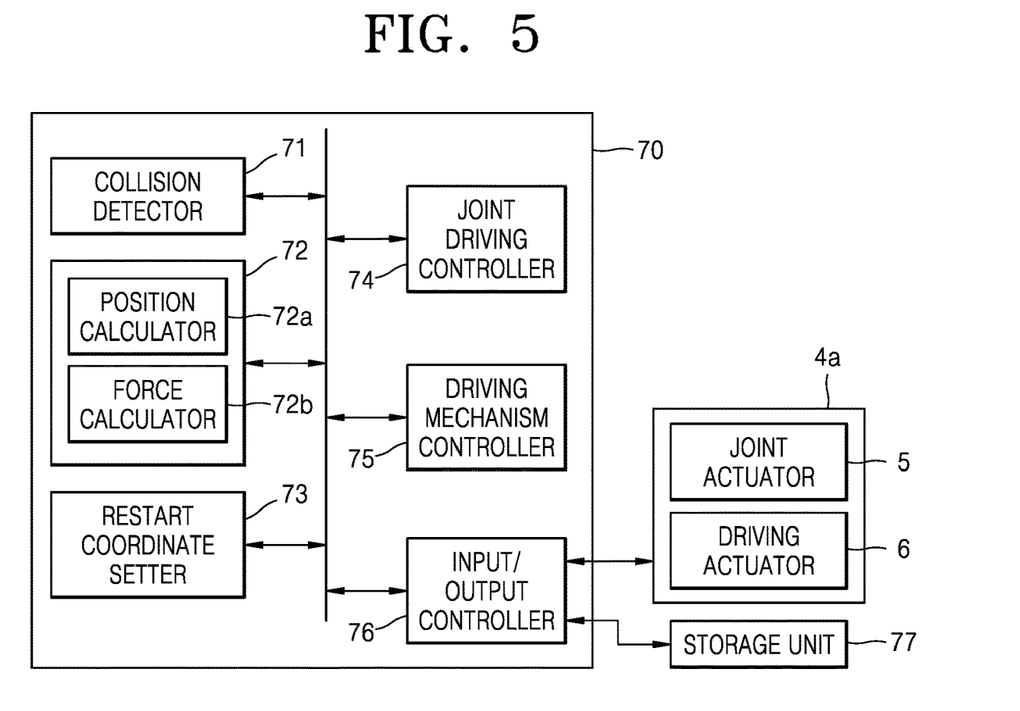
FIG. 5 is a schematic block diagram of a configuration of a controller of the robot control system of FIG. 1 according to an exemplary embodiment.
Figure 6:
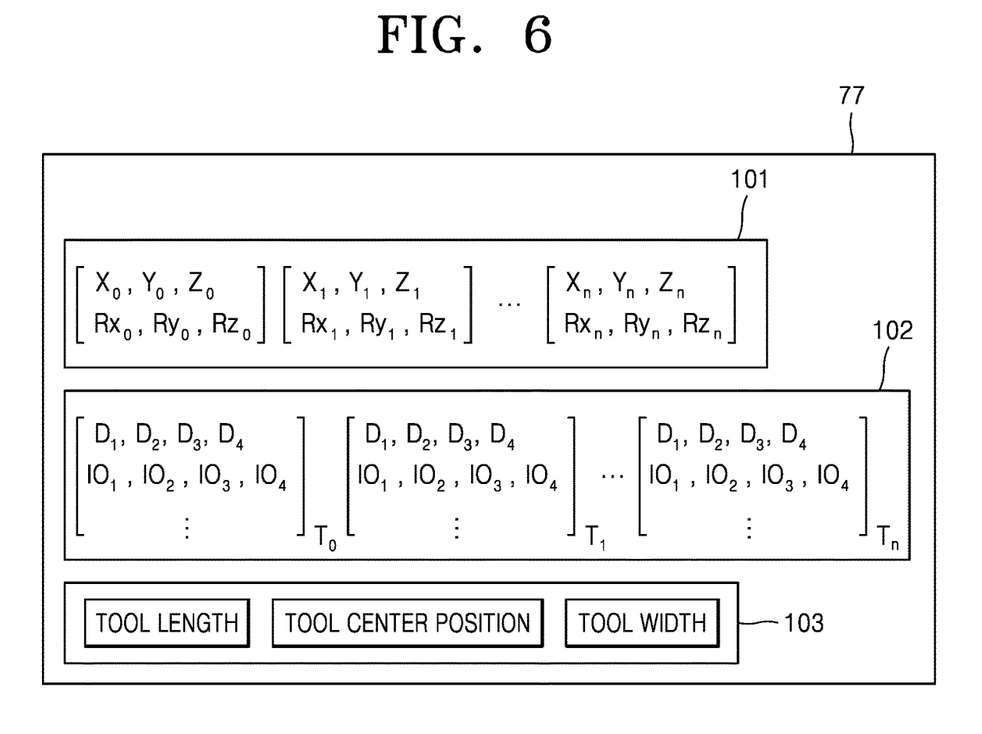
FIG. 6 is an exemplary block diagram of a configuration of some constituent elements of the controller of FIG. 5.

FIG. 5 is a schematic block diagram of a configuration of the controller 70 of the robot control system of FIG. 1. FIG. 6 is an exemplary block diagram of a configuration of some constituent elements of the controller 70 of FIG. 5.

The robot control system may include the controller 70 for controlling the robot 4 which includes an actuator 4a.

The controller 70 may include a collision detector 71 for detecting a collision between the robot 4 and the external object 9 during moving of the robot 4, a joint driving controller 74 and a driving body controller 75 as driving controllers for controlling the actuator 4a, a position and force calculator 72 for calculating a collision force applied to the robot 4 during a collision between the robot 4 and the external object 9 and at least one of the collision position coordinate information and the pushed position coordinate information, and a restart coordinate setter 73 for calculating a restart coordinate indicating a restart position to restart the moving operation of the robot 4 after the occurrence of an accidental collision.

The controller 70 may be implemented in a variety of forms, for example, a control computer, a printed circuit board having a control function and equipped with at least one semiconductor chip, at least one semiconductor chip loaded with control software, or a memory including control software that can be embedded in a computer.

The controller 70 may include an input/output interface 76 through which the controller 70 are connected to the actuator 4a and a storage 77. Here, the input/output interface 76 may include any one or any combination of a digital modem, a radio frequency (RF) modem, a WiFi chip, and related software and/or firmware. The storage 77 stores current position information of a joint actuator 5 and a driving actuator 6. The storage 77 may include a volatile memory such as a random access memory (RAM) or a non-volatile memory such as a flash memory. In addition, the storage 77 may include at least one of a solid state drive (SSD), a hard disk drive (HDD), and an optical disk drive (ODD).

The joint actuator 5 drives the joints 3a, 3b, and 3c of the robot 4. The joint actuator 5 may include a plurality of joint actuators for respectively driving the joints 3a, 3b, and 3c of the robot 4. The driving actuator 6 drives the driving body 7 of the robot 4, and also may have a plurality of driving actuators.

Each of the joint actuator 5 and the driving actuator 6 may include, for example, a rotating shaft that rotates, an encoder that detects a change in the position of the rotating shaft, and a motor that is operated by an electrical signal.

Since the embodiment is not limited by an implementation method of the joint actuator 5 and the driving actuator 6, the joint actuator 5 and the driving actuator 6 may be implemented by a linear motor that moves linearly, not by a motor having a rotating shaft.

The collision detector 71 performs a function of generating a signal by detecting a collision between the robot 4 and the external object 9 during moving of the robot 4. For example, the collision detector 71 may detect an accidental collision between the robot 4 and the external object 9 by sensing a change in a current flowing at least one of the motors of the joint actuator 5 and the driving actuator 6.

In another example of the operation of the collision detector 71, the collision detector 71 may detect a collision by comparing a command value transmitted to the actuator 4a with an operation result value of the actuator 4a that is actually operated by the command value. For this operation, the collision detector 71 may use actuator operation data about the command value and the actual operation result value related to a normal operation range of each of the joint actuator 5 and the driving actuator 6.

For example, a command value that may be input to the joint actuator 5 and the driving actuator 6 and a reference operation result value at which the joint actuator 5 and the driving actuator 6 are operated by the command value in a normal operation situation having no external disturbance are previously stored in the storage 77 as actuator operation data. During moving of the robot 4, when a difference between the actual operation result value and the reference operation result value of the joint actuator 5 and the driving actuator 6 exceeds a preset threshold value, the collision detector 71 may determine that a collision occurs, and thus, generate a detection signal indicating occurrence of an accidental collision.

Embodiments are not limited by a detailed configuration of the collision detector 71. The collision detector 71 may be implemented in various forms. For example, the collision detector 71 may be implemented by using an acceleration sensor that detects an amount of impact.

The joint driving controller 74 and the driving body 7 controller 75 that are driving controllers may select one of a plurality of driving modes and control the joint actuator 5 and the driving actuator 6.

The driving modes operated by the driving controller may include at least two of a speed control mode, a position control mode, a torque control mode (force control mode), and a torque retaining mode (force retaining mode).

The position control mode is a method of accurately controlling the position of a robot. The speed control mode is a method of stably controlling moving and operation speeds of a robot. The torque control mode is a method of controlling the respective amounts of torque generated by the joint actuator 5 and the driving actuator 6. The torque retaining mode is a method of controlling the respective amounts of torque generated by the joint actuator 5 and the driving actuator 6 to be constant. Here, the respective amounts of torque may be the same or different from one another in each of the driving modes. For example, in the torque retaining mode, an amount of torque generated by the joint actuator 5 may be the same as or different from an amount of torque generated by the driving actuator 6.

In the torque retaining mode, the amounts of toque generated by the motors of the joint actuator 5 and the driving actuator 6 are controlled to be constant at respective preset retaining torques or less.

When the collision detector 71 detects a collision of the robot 4, the joint driving controller 74 and the driving body controller 75 may select the torque retaining mode among the driving modes, in which the torques generated by the joint actuator 5 and the driving actuator 6 of the actuator 4a are maintained constant, thereby controlling the actuator 4a.

In other words, until a collision occurs, the joint driving controller 74 and the driving body controller 75 control the actuator 4a in any one mode of the speed control mode, the position control mode, and the torque control mode. When a collision occurs, the joint driving controller 74 and the driving body controller 75 control the actuator 4a by switching the driving mode to the torque retaining mode.

Since, in the torque retaining mode, the robot 4 is controlled to generate a minimum amount of torque to maintain current posture and position, when an external torque acting on the robot 4 by an external force transferred to the robot 4 from the outside is greater than a reference torque, the joints 3a, 3b, and 3c and the driving body 7 are pushed by the external torque, and thus, the position of the robot 4 is changed. In the torque retaining mode, the amount of the reference torque is set such that the position of the robot 4 is pushed by a reaction force acting on the robot 4 by the collision. Here, the reference torque may be set to a preset retaining torque of a motor of the joint actuator 5 or the driving actuator 6, or an average value of a preset retaining torque of a motor of the joint actuator 5 and a preset retaining torque of a motor of the driving actuator 6. Information about the reference torque may be prestored in the storage 77.

The position and force calculator 72 may include a force calculator 72b for calculating a collision force applied to the robot 4 during a collision, and a position calculator 72a for calculating at least one of the collision position coordinate information indicating the collision position C and pushed position coordinate information indicating the pushed position S.

The position calculator 72a may calculate the collision position coordinate information and the pushed position coordinate information using the current position information of the joint actuator 5 and the driving actuator 6 stored in the storage 77.

Referring to FIG. 6, the storage 77 may include a position information buffer 101 for storing the current position information during moving of the robot 4, a tool state buffer 102 for storing an operation state of the end effecter 8, and an end effecter information storage 103 for storing basic information related to the shape and size of the end effecter 8, such as a length, a center position, or a width of the end effecter (tool) 8. Here, the end effecter information storage 103 may include a volatile memory such as a RAM or a non-volatile memory such as a flash memory. In addition, the end effecter information storage 103 may include at least one of an SSD, an HDD, and an ODD.

The type of the end effecter 8 mounted on the final end portion of the joints 3a, 3b, and 3c of the robot 4 may be variously changed according to a user who uses the robot 4. Since the basic information related to the shape and size of the end effecter 8 mounted on the robot 4 is stored in the end effecter information storage 103, the basic information of the end effecter 8 may be used when a restart position of the moving operation of the robot 4 is determined after the accidental collision of the robot 4.

The restart coordinate setter 73 may set a restart position for restarting the moving operation of the robot 4 from a collision force calculated by the position and force calculator 72 and at least one of the collision position coordinate information and the pushed position coordinate information.

Furthermore, when the restart coordinate setter 73 sets a restart position, considering that the external object 9 may still exist on the moving path of the robot 4, interference between the robot 4 and the external object 9 may be reduced. In other words, when the restart coordinate setter 73 sets a restart position, after calculating an adjustment position as a position to avoid the interference between the robot 4 and the external object 9 by using at least some pieces of information such as the collision position and the pushed position of the robot 4, the size of the robot 4, and the length of the end effecter 8, the restart position is set by selecting one of the collision position and the adjustment position.

Furthermore, after the restart coordinate setter 73 sets the restart position, a proximity position that is closest to the pushed position is determined among the positions on the moving path of the robot 4. And then, either the proximity position or the restart position, that is closest to the pushed position, may be set to be a final restart position for restarting the moving operation of the robot 4 through the comparison between the distance between the pushed position and the proximity position and the distance between the pushed position and the restart position.

Figure 7:
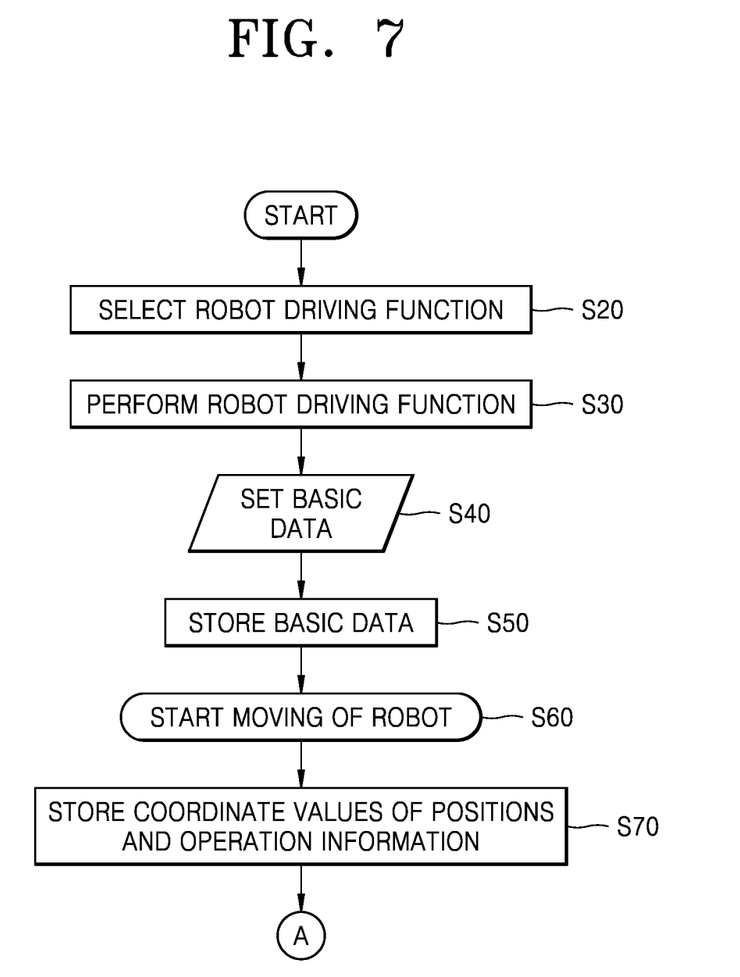
FIG. 7 is an exemplary flowchart showing operations of a robot control method performed by the robot control system of FIG. 1.
Figure 8:
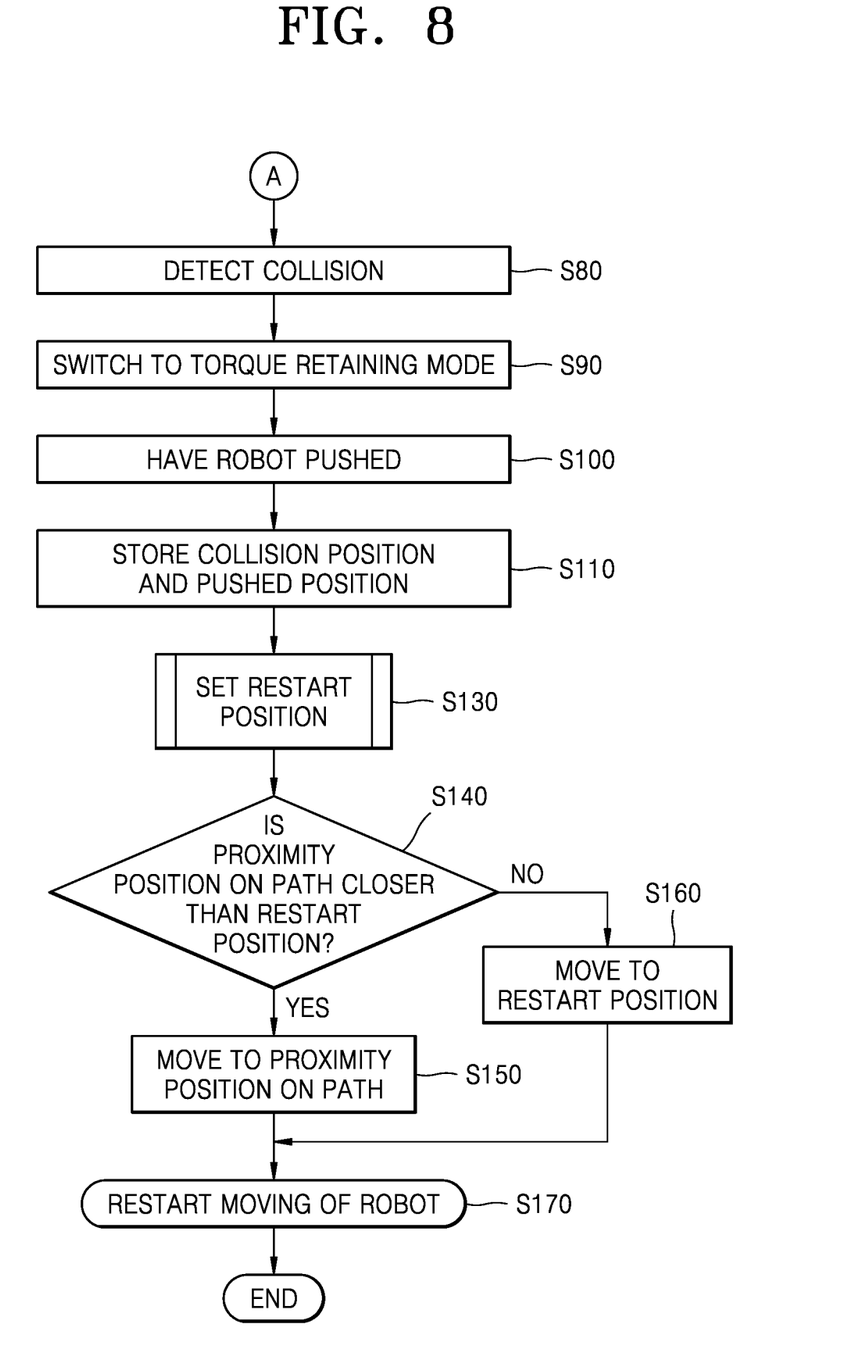
FIG. 8 is an exemplary flowchart showing other operations subsequent to the flowchart of FIG. 7.

FIG. 7 is an exemplary flowchart showing operations of a robot control method by the robot control system of FIG. 1. FIG. 8 is an exemplary flowchart showing the subsequent operations of the flowchart of FIG. 7.

A robot control method according to an embodiment may include, among various functions to operate a robot, selecting a robot driving function (S20), performing the robot driving function (S30), setting basic data for the robot driving function (S40), storing the set basic data in a storage (S50), starting a moving operation of a robot using the basic data (S60), storing, in the storage, coordinate values of the positions of a moving path during moving of the robot and information about the operations of joints and an end effecter of the robot (S70), detecting a collision between the robot and an external object (S80), switching to a torque retaining mode when a collision is detected (S90), having a position of the robot pushed by a reaction force by the collision simultaneously with or immediately after the switching to the torque retaining mode (S100), storing a collision position where the collision occurs and a pushed position to which the robot is pushed (S110), calculating an adjustment position to avoid interference between the end effecter of the robot and the external object by calculating a collision force and at least one of collision position coordinate information and pushed position coordinate information, and setting a restart position to restart a moving operation of the robot by selecting one of the collision position and the adjustment position (S130), comparing a proximity position that is the closest position to the current position of the robot among the positions of the path with the restart position with the restart position (S140), moving the robot to the proximity position on the path by setting the proximity position on the path to a final restart position when the proximity position on the path is closer than the restart position from a comparison result of the comparing operation (S150), moving to the restart position when the restart position is closer than the proximity position on the path restart position (S160), and restarting a moving operation of the robot (S170).

In the setting of the basic data (S40) and the storing of the basic data in the storage (S50), a user may input the start position P0 and the target position P10 for the moving operation of a robot as illustrated in FIG. 1, and coordinate information about the positions P1 to P9 on the moving path may be automatically calculated by using the coordinate information of the start position P0 and the target position P10 input by the user.

Furthermore, in the setting of the basic data (S40) and the storing of the basic data in the storage (S50), values of a tool center point (TCP) indicating the operations of joints and an end effecter during moving of the driving body 7 of a robot may be designated. Accordingly, the robot moves along a preset moving path and simultaneously is ready to change the positions and postures of the joints end the effecter.

When the collision force applied to the robot is calculated in the calculating of a coordination (S130), the size and direction of the collision force applied to the robot may be calculated by using angle values of the joints of a robot and external torque values applied to the joints as inputs and using a Jacobian matrix.

Referring to Equation 1, "$\dot{x}$" denotes a matrix indicating a linear velocity of the end effecter of a robot, "$\dot{q}$" denotes a matrix indicating an angular velocity of the joints of a robot, and "J" denotes a Jacobian matrix of a robot indicating a relationship between "$\dot{x}$" and "$\dot{q}$".

$$\dot{x} = J \times \dot{q} \qquad \text{[Equation 1]}$$

Referring to Equation 2, "Fx" denotes a force acting on the end effecter of a robot (the size and direction of a force), "Fq" denotes a matrix indicating a torque acting on the joints of a robot, and "J" denotes a Jacobian matrix of a robot.

$$Fx = J \times Fq \qquad \text{[Equation 2]}$$

Thus, the linear velocity of the end effecter of a robot may be identified by using the angle value of the joints of a robot and the Jacobian matrix, and the size and direction of the force acting on the end effecter of a robot may be identified by using the torque actually acting on the joints and the Jacobian matrix.

Since the size and direction of the force acting on the end effecter of a robot due to a collision may be calculated, in the restarting the moving operation of a robot (S170), the moving operation may be stably restarted by adjusting sensitivity of the size of a force generated by the joints of a robot and the driving body for restarting of the moving operation of a robot and a moving speed of a robot.

$$\text{External Torque} = \text{Actual Torque} - (\text{Dynamic Torque} + \text{FrictionTorque}) \qquad \text{[Equation 3]}$$

The torque acting on the joints of a robot (external torque) may be obtained by using a relationship between an actual torque, a dynamic torque, and a friction torque of a motor shown in Equation 3.

In the setting of a restart position (S130), a distance between the collision position C and the pushed position S, that is, a pushed distance, illustrated in FIG. 4 may be calculated by using Equation 4.

$$\text{Pushed Distance} = \sqrt{(x_1-x_2)^2+(y_1-x_2)^2+(z_1-z_2)^2} \quad \text{[Equation 4]}$$

In the setting of a restart position (S130), the adjustment position that is a position to avoid interference between the robot and the external object by using at least some pieces of information such as the calculated pushed distance, the size of a robot, and the length of the end effecter. After calculating the adjustment position, any one of the collision position and the restart position is selected and set to be a restart position.

According to the above-described robot control system and control method of the robot control system, when an accidental collision occurs, the driving mode of a robot is rapidly changed to the torque retaining mode so that the robot is moved to the pushed position by the reaction force due to the collision. Thus, damage to the robot and the external object due to the collision may be reduced.

Furthermore, since the robot rapidly identifies the collision position and the pushed position and automatically sets the restart position after an accidental collision, a restart operation may be rapidly resumed.

Furthermore, although the size of the end effecter of a robot may be various according to users, the interference between the end effecter and the external object may be reduced by setting a restart position of a robot based on information such as a different size of the end effecter of a robot, and safety in the moving operation of a robot after an accidental collision may be secured.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), RAM, compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units (collectively "components" in this paragraph) represented by a block in the drawings such as FIG. 5 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A robot control system for controlling a robot including at least one actuator, the robot control system comprising,
   a collision detector configured to detect a collision occurring between the robot and an external object during movement of the robot; and
   at least one processor to implement:
      a driving controller configured to control the at least one actuator to drive a driving body of the robot or move at least one joint of the robot, the at least one actuator including a drive actuator or a joint actuator;
      a position calculator configured to calculate collision position coordinate information indicating a collision position where the collision occurs and pushed position coordinate information indicating a pushed position to which the robot is pushed by a collision force generated from the collision; and
      a restart coordinate setter configured to set the collision position or a position included in a preset moving path of the robot and spaced apart from the collision position as a restart position for restarting a moving operation of the robot,
   wherein the preset moving path is a route of the robot to a target position,
   wherein the driving controller is configured to control the at least one actuator by selecting one of a plurality of driving modes, and the driving controller is further configured to, in response to detecting the collision by the collision detector, control the at least one actuator by selecting a force retaining mode among the plurality of driving modes, in which a force generated by the at least one actuator is maintained to be within a predetermined range,
   wherein the at least one processor further implements a force calculator configured to calculate the collision force applied to the robot,
   wherein the pushed position coordinate information calculated by the position calculator indicates a position to which the robot is pushed by the collision force in response to the driving controller controlling the at least one actuator by selecting the force retaining mode, and wherein the restart coordinate setter is configured to set the restart position for restarting the moving operation of the robot based on a result of the calculation by the position calculator and a result of the calculation by the force calculator.

2. The robot control system of claim 1, wherein the robot further comprises an end effecter, and the restart coordinate setter is further configured to:

calculate, from the collision position coordinate information and the pushed position coordinate information, a moving distance of the robot after the collision occurs;

calculate, based on a dimension of the end effecter and the moving distance, an adjustment position for avoiding interference between the end effecter and the external object, the adjustment position being included in the preset moving path of the robot; and select one of the collision position and the adjustment position as the restart position for restarting the moving operation of the robot.

3. The robot control system of claim 1, wherein the at least one actuator comprises a motor that is operated by an electrical signal, and the collision detector is configured to detect the collision by sensing a change of a current of the motor.

4. The robot control system of claim 1, wherein the collision detector is configured to detect the collision by comparing a command value transmitted to the at least one actuator with an operation result value of the at least one actuator operated by the command value.

5. The robot control system of claim 4, wherein the actuator comprises:

a rotating shaft;

an encoder configured to detect a change in a position of the rotating shaft;

a motor operated by an electrical signal, and wherein the collision detector is configured to detect the collision from a detection signal of the encoder.

6. The robot control system of claim 1, wherein the plurality of driving modes used by the driving controller comprise at least two modes selected from a speed control mode for controlling driving speed of the robot, a position control mode for controlling a position of the robot, a force control mode for controlling a force generated by the robot, and the force retaining mode.

7. The robot control system of claim 1, wherein the robot comprises the at least one joint and the driving body, the at least one joint is a plurality of joints, and the at least one actuator is a plurality of actuators that comprises the joint actuator for driving the plurality of joints and the drive actuator for driving the driving body, and wherein, in the force retaining mode executed in response to detecting the collision, the plurality of actuators is configured to generate a retaining force to maintain the plurality of joints and the driving body at current positions, and be operated such that, in the force retaining mode, in response to determining that an external force applied to the robot from outside is greater than the retaining force, at least one of the current positions of the plurality of joints and the driving body is changed by the external force.

8. The robot control system of claim 7, wherein, in the force retaining mode, a size of the retaining force is set such that the robot is pushed to change at least one of the current positions by a reaction force acting on the robot in response to detecting the collision.

9. The robot control system of claim 7, wherein the robot further comprises an end effecter provided at a final end portion of the plurality of joints, and wherein the force calculator is further configured to calculate a size and direction of the collision force applied to the robot by using, as inputs, an angle value of the joints and an external torque value applied to the plurality of joints, and using a Jacobian matrix.

10. The robot control system of claim 7, further comprising a storage configured to store current position information of the joint actuator and the drive actuator, wherein the position calculator is configured to calculate the collision position coordinate information and the pushed position coordinate information using the current position information.

11. The robot control system of claim 10, wherein the robot further comprises an end effecter provided at a final end portion of the plurality of joints, wherein the restart coordinate setter is further configured to calculate a moving distance of the robot as a result of the collision, based on the collision position coordinate information and the pushed position coordinate information, and set the restart position of the robot based on a dimension of the end effecter and the moving distance.

12. The robot control system of claim 11, wherein, in response to determining that there is a position which is closer to the pushed position of the robot than the restart position on the preset moving path of the robot, the restart coordinate setter is configured to reset the closer position as the restart position.

13. A method of controlling a robot, comprising:

setting a moving path of the robot, the moving path being a route of the robot to a target position;

controlling the robot to move along the moving path;

detecting a collision occurring between the robot and an external object during movement of the robot;

in response to detecting a collision of the robot in the moving path, controlling the robot in a force retaining mode, including:

controlling the robot to maintain a current position of the robot at which the collision occurs by driving a driving body of the robot, and based on an external force being applied to the robot being greater than a reference force, allowing the robot to move to a changed position, that is not on the moving path, due to the external force;

calculating collision position coordinate information indicating a collision position where the collision occurs and pushed position coordinate information indicating a pushed position to which the robot is pushed by a collision force generated from the collision;

calculating the collision force applied to the robot; and determining a restart position at which an operation of the robot is restarted, based on a result of the calculating of the collision position coordinate information and the pushed position coordinate information, and the calculating of the collision force, wherein the pushed position coordinate information indicates a position to which the robot is pushed by the collision force while the robot is being controlled in the force retaining mode, and wherein the restart position for restarting the moving operation of the robot is determined based on a result of the calculating of the collision position coordinate information and the pushed position coordinate information, and a result of the calculating of the collision force.

14. The method of claim 13, wherein, in the force retaining mode in response to detecting the collision, the robot is controlled not to generate a force greater than the reference force.

15. The method of claim 14, wherein the determining the restart position comprises:

calculating an adjustment position which is spaced apart from the current position where the collision occurs; and determining the adjustment position as a restart position.

16. The method of claim 14, the determining the restart position comprises:

calculating an adjustment position which is spaced apart by a predetermined distance from the current position where the collision occurs;

determining a proximity position, which is the closest to the changed position, among a plurality of preset positions in the moving path; and selecting one of the proximity position and the adjustment position as the restart position considering distances from the changed position to the proximity position and the adjustment position.

17. The method of claim 13, wherein the controlling the robot in the force retaining mode further comprises:

in response to detecting the collision of the robot, controlling to limit a force generated by the robot to a predetermined range.

18. The method of claim 17, wherein the allowing the robot to move to the changed position comprises:

comparing the external force with the predetermined range; and in response to determining that the external force is greater than or equal to the predetermined range, controlling the robot to change its current position.

19. The robot control system of claim 1, wherein the restart coordinate setter is further configured to compare a first distance between the pushed position and the collision position with a second distance between the pushed position and the position included in the preset moving path, and set the restart position as the collision position or the pushed position based on a shortest distance from among the first distance and the second distance.

* * * * *